May 22, 1956 — A. T. SCHMIDT — 2,746,339
MEANS FOR TEACHING PIANO PLAYING
Filed Aug. 30, 1951 — 3 Sheets-Sheet 1
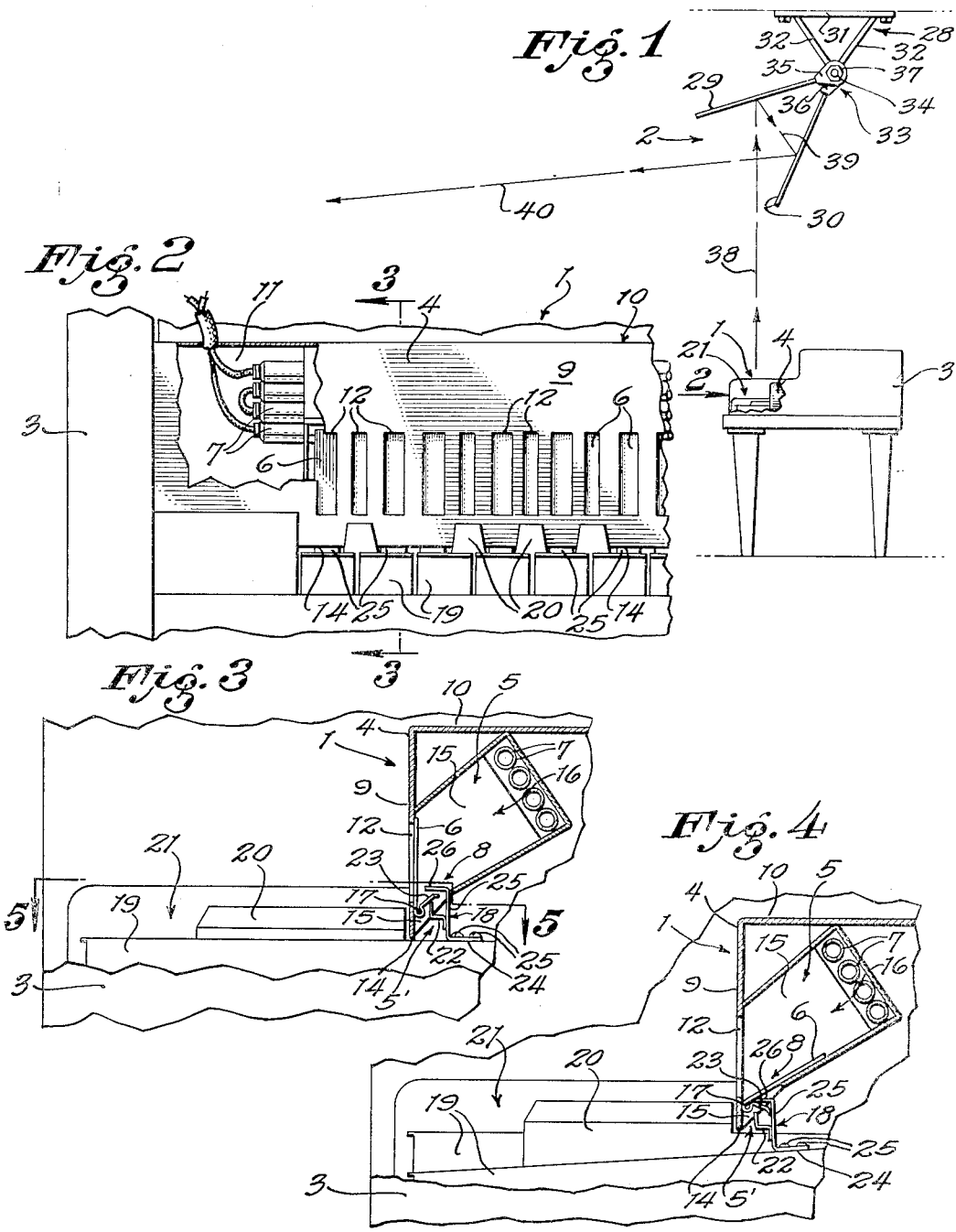
Inventor,
ALFRED T. SCHMIDT
Attorney May 22, 1956   A. T. SCHMIDT   2,746,339
MEANS FOR TEACHING PIANO PLAYING
Filed Aug. 30, 1951   3 Sheets-Sheet 2
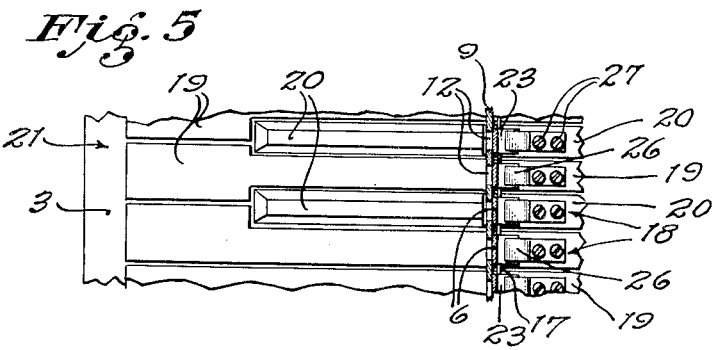
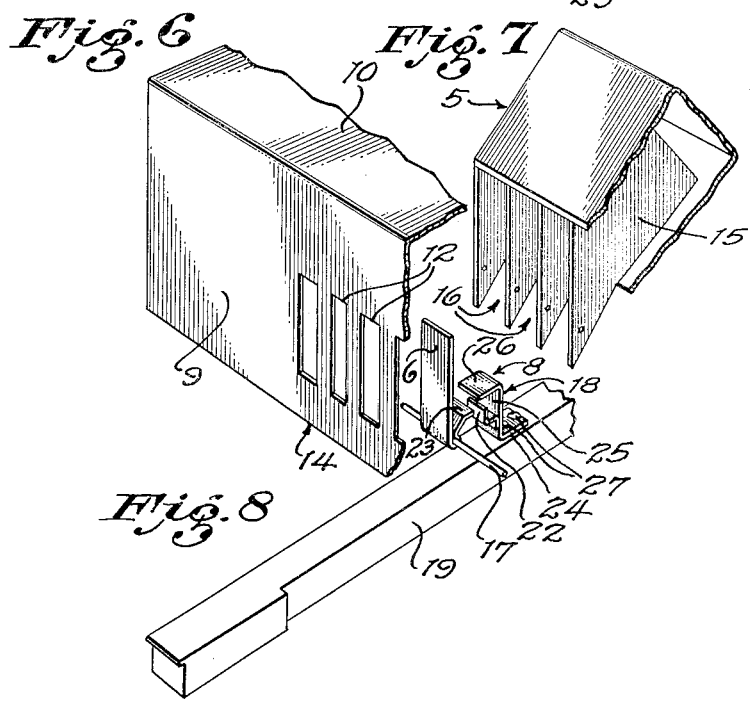
Inventor,
ALFRED T. SCHMIDT
By Calvin Brown,
Attorney May 22, 1956　　　A. T. SCHMIDT　　　2,746,339
MEANS FOR TEACHING PIANO PLAYING
Filed Aug. 30, 1951　　　　　　　　　　　　3 Sheets-Sheet 3
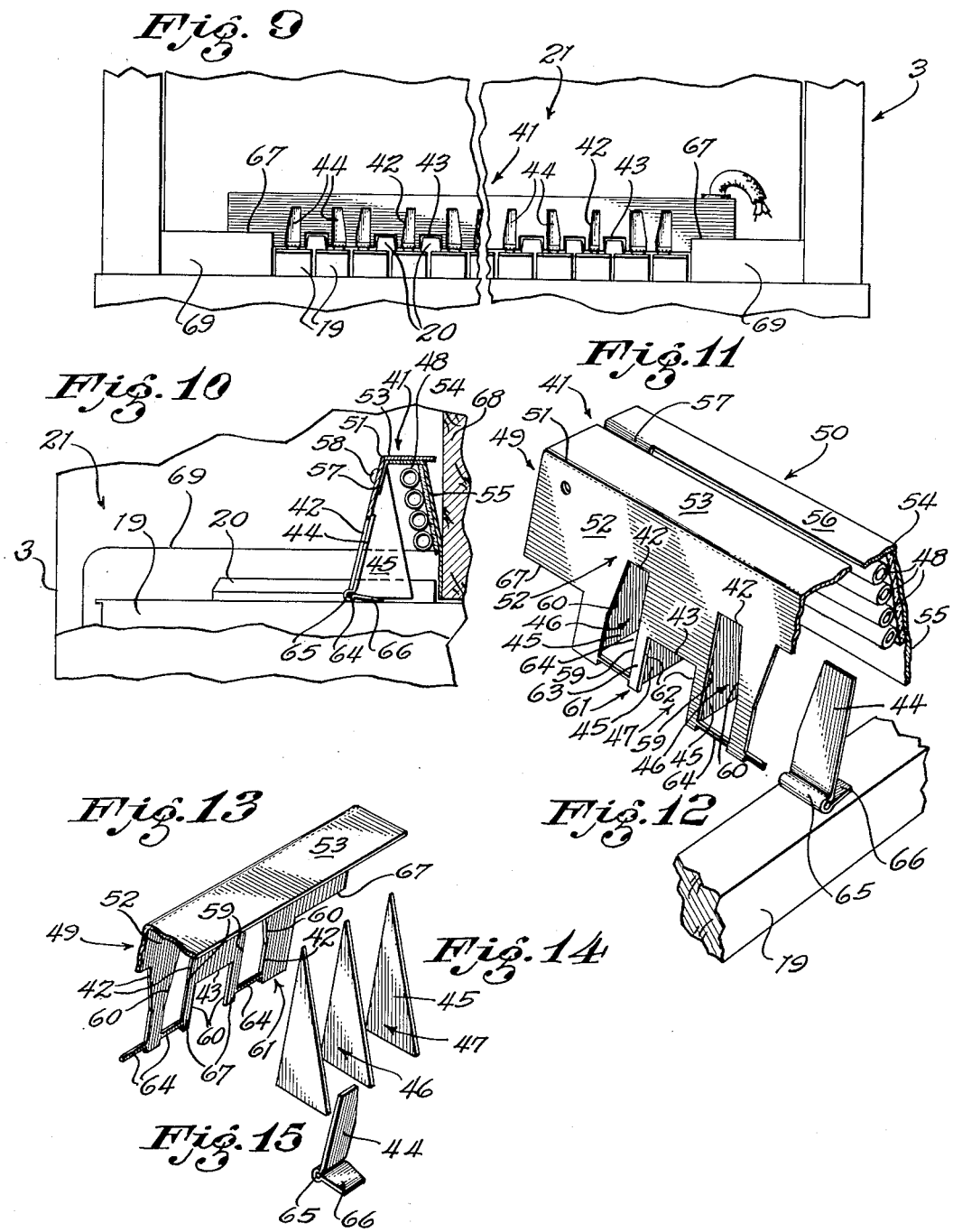
Inventor,
ALFRED T. SCHMIDT
Attorney United States Patent Office 2,746,339
Patented May 22, 1956

2,746,339
MEANS FOR TEACHING PIANO PLAYING

Alfred T. Schmidt, North Hollywood, Calif.

Application August 30, 1951, Serial No. 244,401

6 Claims. (Cl. 84—478)

The present invention relates to means for teaching piano playing. It has been the practice with numerous schools to attempt to teach piano playing by ear, utilizing very simple melodies and having the pupil watch the instructor as the instructor plays the same, the pupil playing by imitation. However, such methods are not always satisfactory as the pupil may not have an ear for music, and also may not readily observe the playing by the instructor. Accordingly an object of the present invention is to provide means whereby the pupil may watch the fingering of the keys by the instructor as well as hear the melody in such a manner that a definite impression is made upon the pupil of the fingering by the instructor.

In the practice of the present invention the standard piano keyboard is utilized and the pupil is placed rearwardly of the instructor so that the pupil may observe the fingering by the instructor on the keyboard by looking at a mirror. There are two mirrors placed above the piano keys. One of said mirrors picks up the image of the keys and reflects it to a second mirror and the second mirror reflects the keys into the eyes of the observer. Thus a pupil may readily watch the actual fingering by the instructor without, as a matter of fact, seeing anything other than the keyboard and the instructor's fingers as the keys are played. In addition, the invention contemplates a means whereby the particular keys played are illuminated. Thus by providing lights of different color, such as red, green, yellow or white, and by illuminating only the keys that are played, the pupil is given a visual picture of the exact location of the fingers on the keys and the particular keys actually played.

Experience has taught that in classes utilizing the present invention pupils are often able, within an hour, to play simple melodies without any previous piano playing experience. Experience has also taught that if a pupil finds that he is able to play simple melodies, the interest in music is enhanced, with the result that the pupil may seriously study music and become an accomplished musician.

In the drawings:

Figure 1 is a side view of a piano incorporating the invention and showing the mirrors so positioned as to reflect the keyboard to the eyes of an observer.

Figure 2 is a fragmentary front elevation on an enlarged scale of one form of the invention as applied over the keyboard and looking in the direction of the arrow 2 of Figure 1;

Figure 3 is a view taken on the line 3—3 of Figure 2;

Figure 4 is a view similar to that of Figure 3, one of the keys being depressed;

Figure 5 is a fragmentary, partially sectional view on the line 5—5 of Figure 3;

Figure 6 is a fragmentary view of a portion of the casing used in the practice of the invention of the form shown in Figures 3 to 5 inclusive.

Figure 7 is a fragmentary, partially sectional view of partition members used rearwardly of the casing of Figure 6.

Figure 8 is a fragmentary, perspective view of one of the keys and associated elements of the invention;

Figure 9 is a front elevation of a modified form of the invention as applied over the keyboard of a piano;

Figure 10 is a sectional view on the line 10—10 of Figure 9;

Figure 11 is a fragmentary, perspective view of the modified form of construction;

Figure 12 is a fragmentary, perspective view of one of the keys utilized with the construction shown in Figures 9, 10 and 11;

Figure 13 is a fragmentary rear elevation of the casing member utilized in the form of invention shown in Figures 9 to 12 inclusive;

Figure 14 is a rear elevation of the partition members utilized with the casing shown in Figure 13; and Figure 15 is a perspective view of one of the shutter elements utilized with the casing and partitions of Figures 13 and 14.

Referring to the drawings, my invention includes a key-lighting device, designated generally 1, and a key-viewing mirror device designated 2, which key-lighting device 1 is mounted on a piano 3, and which key-viewing device is suspended from the ceiling of the room in which the piano is located, above the piano keyboard in position for use, when the piano is played, for teaching piano students how to play the piano in the manner hereinafter more fully described.

The key-lighting device 1 comprises an elongated housing 4, an elongated light chamber 5 secured within said housing, in which chamber are mounted a plurality of shutters 6, a plurality of neon light tubes 7, and key-actuated shutter-swinging means 8 for each shutter swinging said shutters 6 open or closed, as the piano keys are depressed or released in playing the piano, in the manner and for the purpose hereinafter more fully described. The housing 4 is constructed with a front vertical wall 9, a top wall 10 and a rear wall 11 depending from the rear edge of said top wall. The vertical front wall 9 is provided with a plurality of vertical slots 12, which slots extend upwardly from a horizontal line a short distance above the lower edge 14 of the front wall 9 of the housing 4. A plurality of spaced vertical partitions 15 are secured in the light chamber 5, extending vertically from the lower wall to the upper wall of said chamber, and rearwardly from the front wall 9 of the housing 4, at points between the slots 12 to the neon-light tubes 7 immediately forwardly thereof, providing a plurality of light passages 16 between the said adjacent partitions extending forwardly from said neon-light tubes to said slots 12. The shutters 6 are hinged at their lower ends, in spaced relation, on a rod 17 in the front ends of the light passages 16 respectively, adjacent the inner side of the front wall 9 of the housing 4 behind the light slots 12 and immediately below the lower ends of said slots. Said rod 17 extends longitudinally through the lower forward part of the housing 4 including the end walls, partitions 15 and light passages 16 of said housing, and said rod 17 is secured at its ends in the end walls of said housing. The key-actuated shutter-swinging means 8 for each shutter 6 comprises a Z-shaped bracket 18 secured to each key 19 and 20 of the piano keyboard 21, an engaging arm 22 secured at its lower end to said Z-shaped bracket 18, and a lug 23 secured to the inner side of the shutter 6 near the lower end of said shutter and extending rearwardly and upwardly from said shutter. The Z-shaped bracket 18 comprises a base flange 24, an upright 25 upstanding from the forward end of said base flange, and a horizontal lug 26 extending forwardly from the upper end of said upright 25 over the inclined lug 23 which is secured to the shutter 6. The Z-shaped bracket 18 is secured to the upper side of a key 19 or 20 by screws 27 passed through the base flange 24 of said bracket 18. The engaging arm 22 is secured at its lower end to the forward side of the upright 25 of the Z-shaped bracket 18 and extends forwardly and upwardly from said bracket upright under the lug 23 secure to the shutter 6.

The light chamber 5 extends rearwardly and upwardly in the housing 4 from the front wall 9 of said housing, and the vertical light slots 12 in said front wall 9 of said housing lead outwardly from the forward ends of the light passages 16 in the light chamber 5. The neon light tubes 7 are mounted in the rear upper end of the light chamber 5, which is inclined rearwardly and upwardly so that said light tubes are mounted at such an elevation above the piano keyboard as to project their rays of light forwardly and downwardly at the correct inclination upon the piano keyboard as to enable the students looking into the mirror device 2 to observe the fingers of the performer on the keyboard to the best advantage.

The key-viewing mirror device 2 comprises a ceiling bracket 28 and a pair of reflecting mirrors 29 and 30 adjustably mounted on said bracket, below which mirrors the piano 3 is positioned to enable the mirrors to reflect the fingers of a performer playing the piano to the musical students sitting in the audience back of the performer. The ceiling bracket 28 comprises a base plate 31, a pair of downwardly converging rods 32 depending from said base plate, and a bearing 33 secured on the lower ends of said rods 32, in which bearing said mirrors are pivotally mounted on a pivot bolt 34. The mirrors 29 and 30 are formed at their upper ends with knuckles 35 and 36 respectively, which are placed against the ends, respectively, of said bearing 33 and through which knuckles and said bearing extends said pivot bolt 34. Nuts 37 are threaded on the ends respectively, of said pivot bolt 34 against the mirror knuckles 35 and 36, respectively, for tightening said knuckles against the ends, respectively, of the bearing 33 and thereby securing the mirrors 29 and 30 in any suitably adjusted positions about the axis of the pivot bolt 34, in which positions of said mirrors the movements of the performer's fingers over the piano keyboard 21 are reflected upwardly upon mirror 29, as shown by the line 38, and then outwardly and downwardly from said mirror 30 as shown by the line 40, to the students in the audience behind the instructor at the piano 3.

The operation of my invention, as above described, is as follows:

The "front board" of the piano 3, which is located rearwardly of the keys 19 and 20, is first removed from the piano, and my invention, as above described, is placed in the position normally occupied by said front board, with the lower edge 14 of front wall 9 of the elongated housing 4 of my invention over and adjacent the upper side of the white keys 19 and the lower edge portion of said front wall adjacent the rear ends of the black keys 20, in which position of the housing 4 the bracket 18 and its engaging arm 22 of each key extend upwardly through an opening 5' in the lower wall of the light chamber 5 into the lower forward part of said chamber, with the lug 26 on the upper end of each bracket 18 extending forwardly over the lug 23 on a shutter 6, as shown in Fig. 3 of the drawing. The lug 23 of each shutter is positioned between the upper edge of arm 22 and the lug 26. As the piano teacher strikes the keys 19 and/or 20 of the piano keyboard 21, the lug 26 of the bracket 18 of each key struck engages the lug 23 on a shutter 6, and said shutter is thereby swung down rearwardly toward the lower wall of the light chamber 5 and uncovers a light opening 12 in the front wall 9 of the housing 4, whereupon rays of light from the neon tubes 7 are projected forwardly and downwardly through said light opening over the teacher's fingers and the keys depressed by said fingers. Upon releasing each key after depressing the same, each key is automatically swung back up to its normal position, the engaging arm 22, on the bracket 18 secured to the key, engaging the under side of the lug 23, to swing the shutter upwardly and forwardly to close the light opening 12.

As the teacher plays the piano, the keys struck by the fingers are illuminated by the light projected by the neon-light tubes 7, and the image of the teacher's fingers and the keys struck by his fingers are reflected by said projected light upwardly, as indicated by the line 38, upon the mirror 29, from which mirror said image is reflected, as shown by the line 39 upon the mirror 30, and from which mirror 30 said image is reflected as shown by the line 40, outwardly to the students in the audience, who sit in back of the teacher at little tables, whereby the students are enabled to see exactly which keys the teacher's fingers depress in playing the piano, and in this way the students quickly learn to play the piano, since the illumination of the teacher's fingers and the keys struck by the fingers in playing such music, enables the students to follow the teacher's fingers clearly and accurately.

The modification of my invention, shown in Figs. 9 to 15 inclusive, includes an elongated housing 41 provided with a plurality of light openings 42 and 43; a plurality of shutters 44 for normally closing said light openings 42, which shutters are actuated by the white keys 19 respectively, of the piano 3; a plurality of partitions 45 dividing said housing 41 into a plurality of light passages 46 leading forwardly to said light openings 42, and a plurality of light passages 47 leading forwardly to said light openings 43, and a plurality of neon-light tubes 48 extending longitudinally within the housing 41 at the rear end of said light passages 46 and 47.

The housing 41 is formed in two sections, a front section 49 and a rear section 50. The front section 49 is bent longitudinally intermediate its side edges at an obtuse angle, on a line 51 in the form of a front wall 52, extending upwardly and rearwardly at an inclination, and an upper wall 53 extending rearwardly horizontally from the upper edge of said front wall. The rear section 50 is also bent longitudinally intermediate its side edges on a line 54 in the form of a rear wall 55, extending upwardly and forwardly at an inclination, and an upper wall 56 extending forward horizontally from the upper edge of said rear wall, at a slightly lower elevation than the upper wall 53 of the front section 49 of the housing 41, so that the two sections 49 and 50 may be telescoped with the section 50 within the sections 49 and the upper wall 56 of the section 50 directly under adjacent the upper wall 53 of the rear section 50 of said housing 41, as shown in Fig. 10 of the drawings. Depending lugs 57 are formed on the forward or inner edge of the upper wall 56 of the rear section 50, which lugs are inclined downwardly and forwardly to fit against the upper portion of the inner side of the front wall 52 of the front section 49, and screws 58 are driven through the front wall 52 of said section 49 into threaded engagement with said lugs to hold the sections 49 and 50 detachably together in telescopic relation, as shown in Fig. 10 of the drawings. The light openings 42 in the front wall 52 of the front section 49 of the light housing 41, are each formed with one straight side 59 and one inclined side 60 inclining upwardly from the lower edge 61 of said front wall 52 of the light housing section 49 toward the straight side 59 of the light opening 42, while the straight side 59 of each light opening 42 lies close to and parallel with one of the two parallel sides 62 of one of the openings 43 in the front wall 52 of the housing section 49, leaving narrow strip portions 63 of said front wall 52 extending upwardly from the lower edge 61 of said front wall, between the straight side edges 59 of the two openings 42 at the sides, respectively, of said opening 43, which openings 43 are in the form of substantially square-shaped notches extending upwardly in said front wall 52 from the lower edge 61 of said wall. The openings 42 are also in the form of elongated notches extending and converging upwardly from the lower edge 61 of the front wall 52 of the front housing section 49, except that said front wall 52 is formed with narrow bars 64 extending directly across the lower end portions of the openings 42, around which bars 64 are turnably fitted hinge knuckles 65 formed on the lower ends of the shutters 44, respectively, whereby said shutters are hinged at their lower ends on said bars 64, respectively, for normally closing the openings 42, respectively. From the knuckles 65 of said shutters extend downwardly at an inclination short arms 66, respectively, which rest upon the white keys 19 of the keyboard 21 of the piano 3. The lower corners of the front wall 52 of the front section 49 of the light housing 41 are provided with notches 67 for the purpose about to be described.

In the operation of the modification of my invention, as above described and shown in Figs. 9 to 15 of the drawing, the light housing 41 is placed over the rear portion of the keyboard 21 of the piano 3, with the lower end portion of the rear wall 55 of said housing against the front board 68 of the piano as shown in Fig. 10 of the drawing, with the notches 67 in the lower corners of the front wall 52 of the housing 41 fitted over the upper inner corners of the end blocks 69 at the ends, respectively, of the piano keyboard 21, and with the shutters 44, light openings 42 and the light passages 46 directly over the white keys 19 of the keyboard 21, and the light passages 47 and light openings 43 in the housing 41 directly over the black keys 20 of said keyboard, as shown in Fig. 9 of the drawing. When the piano 3 is not played or when the white keys 19 are not depressed, said keys, in their uppermost positions, engage the arms 66 and hold the shutters 44 in their uppermost positions within the light openings 42 in the front wall 52 of the housing 41 and close said openings, preventing any light from being projected by the neon-light tubes 48, through the light passages 46 and light openings 42 in the light housing 41 over the keys 19 of the keyboard 21, and when the piano is not played or when the black keys 20 are not depressed, said keys, in their uppermost positions, occupy and substantially close the entire areas of the openings 43 in the front wall 52 of the light housing 41 and prevent the light of the neon-light tubes 48 from being projected by said light tubes through the light passages 47 in the light housing 41 over the black keys 20 of the keyboard 21. When the piano 3 is played, the white keys 19, when depressed by the player, allow the shutter arms 66 and the shutters 44 to swing down rearwardly on the pivot bars 64, causing said shutters to uncover and open said openings, whereupon light from the neon-light tubes 48 is projected by said tubes forwardly through the light passages 46 and the light openings 42, directly over said depressed white keys, and over the fingers of the player depressing said keys, while the black keys 20 when depressed by the player leave a space between the upper edges of said keys and the upper edges of the key openings 43 in the front wall 52 of the light housing 41, whereupon light from the neon-light tubes 48 is projected by said tubes forwardly through light passages 47 and the light openings 43 directly over the depressed black keys, and over the fingers of the player depressing said keys.

The piano 3 being positioned with its keyboard 21 directly under the key-viewing device 2, when the piano is played by a teacher, the image of the teacher's illuminated fingers and the piano keys struck by his fingers is reflected upwardly upon the mirror 29 and by said mirror upon the mirror 30, and by the mirror 30 said image is reflected outwardly to the music students in the audience, as hereinbefore described.

I claim:

1. A device for teaching piano playing, including a casing adapted to overlie the keys of a piano, said casing having a series of spaced slots each to register with an individual piano key, an individual hinged shutter for each piano key to close and open its respective slot, a light source within the casing adapted to project light rays through one of said slots as its shutter is opened and thereby to illuminate the key, and means individual to each shutter to move the shutter to close the slot when the key is in normal elevated position and to move the shutter to open position when the key is depressed.

2. The device of claim 1 in which the shutter moving means includes an arm extending rearwardly from the shutter and moving about the shutter hinge as to the proximate key is moved.

3. The device of claim 2 in which each individual key carries a bracket having two spaced lugs, said arm extending between the two lugs so as to be engaged by one lug as the key is depressed and to be engaged by the other lug as the key returns to normal elevated position.

4. The device of claim 1 in which the casing has an inclined front, the shutter hinge is a pivot parallel to the top surface of the key, and the means is an arm integral with the shuttter, said arm resting upon its respective piano key, closing the shutter as the key moves upwardly from a depressed position and causing the shutter to fall to open position as the key is depressed.

5. The device of claim 1 in which a light source comprising a neon light tube extends transversely over a series of slots, and parallel partitions are positioned between the tube and the front of the casing in registry with the spaces between adjacent keys.

6. The device of claim 1 with a mirror assembly including two mirrored surfaces at an acute angle to each other, one surface substantially directly above the piano keys and the other surface reflecting the reflected image rearwardly and downwardly, whereby a group of students behind the instructor playing a simple melody on the piano may see his fingering as they hear the melody.

References Cited in the file of this patent

UNITED STATES PATENTS

| | | |
|---|---|---|
| 667,541 | Loring | Feb. 5, 1901 |
| 1,536,623 | Norvell | May 5, 1925 |
| 1,696,901 | Bostelman | Jan. 1, 1929 |
| 1,708,643 | Votey | Apr. 9, 1929 |
| 1,889,418 | Pierce | Nov. 29, 1932 |
| 1,914,560 | Eitzen | June 20, 1933 |
| 2,234,954 | Bergman | Mar. 18, 1941 |
| 2,264,680 | Roper | Dec. 2, 1941 |
| 2,476,257 | Hoff | July 12, 1949 |
| 2,548,000 | Broughton | Apr. 10, 1951 |

FOREIGN PATENTS

| | | |
|---|---|---|
| 483,437 | Germany | Oct. 4, 1929 |